United States Patent
Meredith et al.

(10) Patent No.: US 9,408,174 B2
(45) Date of Patent: Aug. 2, 2016

(54) FACILITATION OF TIMED FINGERPRINT MOBILE DEVICE LOCATING

(75) Inventors: Sheldon Kent Meredith, Marietta, GA (US); Jeremy Fix, Acworth, GA (US); Mario Kosseifi, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 13/526,988

(22) Filed: Jun. 19, 2012

(65) Prior Publication Data

US 2013/0337844 A1    Dec. 19, 2013

(51) Int. Cl.
| | |
|---|---|
| H04W 24/00 | (2009.01) |
| H04W 64/00 | (2009.01) |
| H04W 4/02 | (2009.01) |
| G01S 11/06 | (2006.01) |

(52) U.S. Cl.
CPC ............ *H04W 64/00* (2013.01); *G01S 11/06* (2013.01); *H04W 4/02* (2013.01)

(58) Field of Classification Search
CPC ..... H04W 4/021; H04W 4/023; H04W 4/025; H04W 64/00; H04W 4/02; H04W 64/003; G01S 5/00; G01S 5/0252; G01S 11/06; G01S 5/0036
USPC ............ 455/404.1, 404.2, 456.1–456.6, 457, 455/458
See application file for complete search history.

(56) References Cited

U.S. PATENT DOCUMENTS

| | | | |
|---|---|---|---|
| 4,718,081 A | 1/1988 | Brenig | |
| 5,515,062 A | 5/1996 | Maine et al. | |
| 5,724,660 A | 3/1998 | Kauser et al. | |
| 5,732,354 A | 3/1998 | MacDonald | |
| 5,732,383 A | 3/1998 | Foladare et al. | |
| 5,831,545 A | 11/1998 | Murray et al. | |
| 5,844,521 A | 12/1998 | Stephens et al. | |
| 5,982,324 A | 11/1999 | Watters et al. | |
| 6,018,312 A | 1/2000 | Haworth et al. | |

(Continued)

FOREIGN PATENT DOCUMENTS

| | | |
|---|---|---|
| EP | 0856746 A2 | 8/1998 |
| EP | 1145526 | 10/2001 |
| JP | 2004069609 A | 3/2004 |
| JP | 2005091303 A | 4/2005 |
| JP | 2007328050 A | 12/2007 |
| WO | WO2006031035 A1 | 3/2006 |

OTHER PUBLICATIONS

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

(Continued)

*Primary Examiner* — Thai Vu
(74) *Attorney, Agent, or Firm* — Amin, Turocy & Watson, LLP

(57) ABSTRACT

Downlink signal strength measurements from base stations (BSs) are reported by mobile devices to facilitate mobile device locating. A system receives the signal strength information and determines whether the mobile device is within a selected distance from any of the BSs in response to detecting that signal strength information for one of the BSs is greater than a predefined value. The system determines an area over which to search for the mobile device if the system fails to detect that the signal strength information for any of the BSs is greater than the predefined value. The area over which the search is performed is an intersection of all regions determined by the signal strengths of the BSs.

20 Claims, 10 Drawing Sheets

(56) References Cited

U.S. PATENT DOCUMENTS

| | | |
|---|---|---|
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,897,805 B2 | 11/2014 | Fix et al. |
| 8,909,247 B2 | 12/2014 | Tipton et al. |
| 9,008,684 B2 | 4/2015 | Tipton et al. |
| 9,008,698 B2 | 4/2015 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1* | 9/2004 | Tsunehara et al. ............ 701/207 |
| 2004/0219930 A1* | 11/2004 | Lin ............................ 455/456.1 |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |

(56) References Cited

U.S. PATENT DOCUMENTS

| | | |
|---|---|---|
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0200303 A1 | 9/2006 | Fuentes et al. |
| 2006/0240839 A1 | 10/2006 | Chen et al. |
| 2006/0240841 A1 | 10/2006 | Bhattacharya |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0049286 A1* | 3/2007 | Kim et al. .............. 455/456.1 |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1* | 9/2007 | Fitch et al. .............. 455/456.2 |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1* | 2/2008 | Phatak et al. .............. 455/456.1 |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1* | 12/2008 | Spain .............. 455/456.6 |
| 2008/0305832 A1 | 12/2008 | Greenberg |
| 2008/0311923 A1 | 12/2008 | Petrovic et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1* | 9/2010 | Miura .............. 455/456.1 |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1* | 1/2011 | Miura .............. 455/67.11 |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1* | 3/2012 | Bogatin .............. 455/456.6 |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |

(56) References Cited

U.S. PATENT DOCUMENTS

| | | | |
|---|---|---|---|
| 2013/0095861 | A1 | 4/2013 | Li et al. |
| 2013/0096966 | A1 | 4/2013 | Barnes |
| 2013/0109407 | A1 | 5/2013 | Tipton et al. |
| 2013/0137464 | A1 | 5/2013 | Kramer et al. |
| 2013/0226451 | A1 | 8/2013 | O'Neill et al. |
| 2013/0281111 | A1 | 10/2013 | Syrjarinne et al. |
| 2013/0324149 | A1 | 12/2013 | Fix et al. |
| 2013/0337824 | A1 | 12/2013 | Meredith et al. |
| 2014/0062782 | A1 | 3/2014 | Abraham |
| 2014/0106779 | A1 | 4/2014 | Arslan et al. |
| 2014/0122220 | A1 | 5/2014 | Bradley et al. |
| 2014/0171060 | A1 | 6/2014 | Cook et al. |
| 2014/0278744 | A1 | 9/2014 | Lo Faro et al. |

OTHER PUBLICATIONS

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http:/www.foxnews.com/printer_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122 9-10-11, 11 pages.
International Search Report for PCT Application No. US2011/026120 dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_en US398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/. . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. 1 page.
Hao Peng, Ban Xuegang(JEFF). Estimating Vehicle Position in a Queue at Signalized Intersections Using Simple Travel Times from Mobile Sensors. 6 pages.
Ban Xuegang(JEFF), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62 pages.

(56) References Cited

OTHER PUBLICATIONS

Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved from http://search.credoreference.com/content/entry/hcengdict/represent/0, 2 pages.
Represent. (2001). In Chambers 21 st century dictionary. Retrieved from http://search.credoreference.com/content/entry/chambdict/represent/O.
Represent. (2011). In the american heritage dictionary of the english language. Retrieved from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jun. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated Dec. 30, 2013 for U.S. Appl. No. 13/305,267, 10 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN Iu interface RANAP signalling.
Calabrese, et al., "Real-Time Urban Monitoring Using Cell Phones: A Case Study in Rome". IEEE Transactions on Intelligent Transportation Systems, 12 pages (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Marko Silventoinen, TIMO Rantalainen, "Mobile Station Locating in GSM" Helsinki, Finland, Last accessed on Nov. 15, 2011, 7 pages.
Office Action dated May 21, 2013 for U.S. Appl. No. 13/305,276, 28 pages.
Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.

(56) References Cited

OTHER PUBLICATIONS

Final Office Action dated Apr. 3, 2014 for U.S. Appl. No. 13/188,295, 37 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 1, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Notice of Allowance dated Jan. 21, 2015 for U.S. Appl. No. 13/495,391, 98 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Corn Bust. PhysicaVerlagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Office Action dated Feb. 13, 2015 for U.S. Appl. No. 13/188,136, 44 pages.
Notice of Allowance mailed Feb. 6, 2015 for U.S. Appl. No. 13/204,535, 20 pages.
Office Action dated Feb. 13, 2015 for U.S. Appl. No. 14/516,286, 62 pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
Notice of Allowance dated Aug. 21, 2014 for U.S. Appl. No. 13/447,069, 78 pages.
Office Action dated Sep. 22, 2014 for U.S. Appl. No. 13/175,199, 62 pages.
Office Action dated Apr. 16, 2015 for U.S. Appl. No. 14/521,431, 82 pages.
Notice of Allowance dated Mar. 19, 2015 for U.S. Appl. No. 13/494,959, 41 pages.
Notice of Allowance dated Mar. 26, 2015 for U.S. Appl. No. 14/276,688, 75 pages.
Office Action dated May 1, 2015 for U.S. Appl. No. 13/557,425, 33 pages.
Office Action dated May 14, 2015 for U.S. Appl. No. 14/530,605, 72 pages.
Office Action dated Jun. 1, 2015 for U.S. Appl. No. 13/447,072, 38 pages.
Office Action dated Jun. 2, 2015 for U.S. Appl. No. 14/516,286, 20 pages.
Office Action dated Jun. 9, 2015 for U.S. Appl. No. 13/495,756, 35 pages.
Notice of Allowance dated Jul. 8, 2015 for U.S. Appl. No. 14/548,901, 125 pages.
Buford, et al., Location Privacy Enforcement in a Location-Based Services Platform, 2009, IEEE, 5 pages.
Philips, Jr., et al., "Information Sharing and Security in Dynamic Coalitions," SACMAT, Jun. 2002, pp. 87-96, ACM, 10 pages.
Moniruzzaman, et al., "A Study of Privacy Policy Enforcement in Access Control Models", Proceedings of 13th International Conference on Computer and Information Technology, Dec. 2010, pp. 352-357, IEEE, 6 pages.
Office Action dated Jul. 22, 2015 for U.S. Appl. No. 13/188,136, 31 pages.
"CELL_DCH", INACON Glossary, http://www.inacon.de/glossary/CELL_DCH.php, Retrieved on Jul. 22, 2015, 1 page.
Office Action dated Sep. 17, 2015 for U.S. Appl. No. 13/495,756, 23 Pages.
Office Action dated Sep. 14, 2015 for U.S. Appl. No. 13/557,425, 32 Pages.
Office Action dated Sep. 18, 2015 for U.S. Appl. No. 14/641,247, 69 Pages.
Notice of Allowance dated Aug. 27, 2015 for U.S. Appl. No. 14/521,431, 39 pages.
Office Action dated Nov. 16, 2015 for U.S. Appl. No. 13/188,136, 31 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Office Action dated Nov. 23, 2015 for U.S. Appl. No. 14/520,287, 80 pages.
Office Action dated Nov. 16, 2015 for U.S. Appl. No. 14/566,657, 87 pages.
Office Action mailed Nov. 30, 2015 for U.S. Appl. No. 13/447,072, 45 pages.
Office Action mailed Dec. 18, 2015 for U.S. Appl. No. 14/548,901, 35 pages.
Office Action mailed Dec. 31, 2015 for U.S. Appl. No. 14/952,609, 32 pages.
Office Action dated Jan. 11, 2016 for U.S. Appl. No. 13/175,199, 29 pages.
Office Action dated Mar. 11, 2016 for U.S. Appl. No. 14/743,076, 86 pages.
Notice of Allowance dated Mar. 16, 2016 for U.S. Appl. No. 14/520,287, 23 pages.
Office Action dated Mar. 18, 2016 for U.S. Appl. No. 13/447,072, 37 pages.
Office Action dated Apr. 5, 2016 for U.S. Appl. No. 13/188,136, 33 pages.
Office Action dated Apr. 13, 2016 for U.S. Appl. No. 14/877,915, 76 pages.
Office Action dated May 17, 2016 for U.S. Appl. No. 15/074,622, 18 pages.
Office Action dated Jun. 10, 2016 for U.S. Appl. No. 14/548,901, 33 pages.
Office Action dated Jun. 22, 2016 for U.S. Appl. No. 14/970,533, 84 pages.

* cited by examiner

FACILITATION OF TIMED FINGERPRINT MOBILE DEVICE LOCATING

TECHNICAL FIELD

The subject disclosure relates to wireless communications and, more particularly, to various embodiments that facilitate timed fingerprint mobile device locating.

BACKGROUND

The computational resources expended to perform processing for mobile device locating can be extensive. Further, performing such processing can be time-consuming. Accordingly, real-time applications based on mobile device locating can be limited, and the cost of such applications can be driven up due to the processing required to facilitate such services.

SUMMARY

The following presents a simplified summary of one or more of the embodiments in order to provide a basic understanding of some embodiments of the embodiments. This summary is not an extensive overview of the embodiments described herein. It is intended to neither identify key or critical elements of the embodiments nor delineate any scope particular embodiments of the embodiments or any scope of the claims. Its sole purpose is to present some concepts of the embodiments in a simplified form as a prelude to the more detailed description that is presented later. It will also be appreciated that the detailed description may include additional or alternative embodiments beyond those described in this summary.

In one or more embodiments, a method can include: receiving, by a system including at least one processor, signal strength information for a plurality of base stations (BSs), wherein the signal strength information is measured by a mobile device; determining, by the system, that the mobile device is within a selected distance from at least one of the plurality of BSs in response to detecting that signal strength information, measured by the mobile device, for the at least one of the plurality of BSs satisfies a pre-defined condition; and determining, by the system, an area over which to search for the mobile device, wherein the determining the area is based, at least, on failing to detect that the signal strength information for any of the plurality of BSs, measured by the mobile device, satisfies the pre-defined condition In one or more embodiments, a non-transitory computer-readable storage medium can store computer-executable instructions that, in response to execution, cause a system including a processor to perform operations. The operations can include: determining signal strength information for a plurality of BSs, wherein the signal strength information is measured by a mobile device; determining that the mobile device is within a selected distance from at least one of the plurality of BSs in response to detecting that signal strength information, measured by the mobile device, for the at least one of the plurality of BSs satisfies a pre-defined condition; and determining an area over which to search for the mobile device, wherein the determining the area is in response to determining that signal strength information for each of the plurality of BSs, measured by the mobile device, fails to satisfy the pre-defined condition.

In one or more embodiments, a system can include a memory that stores computer-executable instructions, and a processor, communicatively coupled to the memory, that facilitates execution of computer-executable instructions to: receive signal strength information for a plurality of BSs, wherein the signal strength information is measured by a mobile device; and search an area for the mobile device, wherein the area comprises an intersection of regions associated with the plurality of BSs, and wherein the search is performed based, at least, on a determination that the signal strength information for each of the plurality of BSs, measured by the mobile device, fails to satisfy the pre-defined condition.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

DETAILED DESCRIPTION

Figure 1:
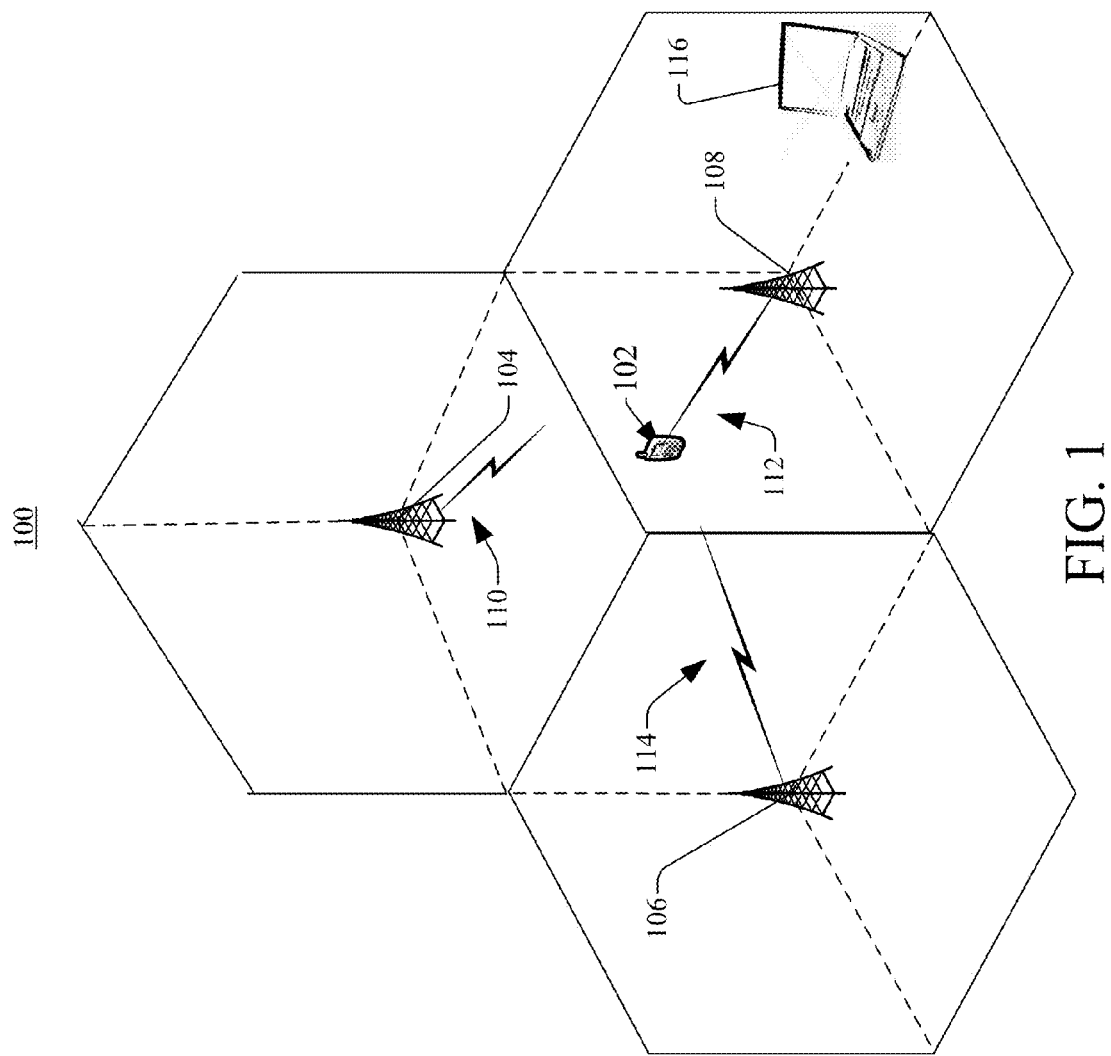
FIG. 1 illustrates an example system in which mobile device locating can be facilitated in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "BS (or BSs)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

Various embodiments described herein relate to a system receiving, signal strength information for a plurality of BSs, wherein the signal strength information is measured by a mobile device. The system also determines that the mobile device is within a selected distance from at least one of the BSs in response to detecting that signal strength information for the BS is greater than a predefined value; and determines an area over which to search to perform locating for the mobile device, wherein the determination of the area is based, at least, on not detecting that signal strength information for any of the BSs is greater than the predefined value.

In some embodiments, determining the area over which to search includes: determining, for the BSs, expected downlink signal powers as functions of a plurality of parameters; employing the signal strength information as proxies for distance between the mobile device and the BSs; determining regions around the BSs based, at least on the signal strength information and locations of the BSs; and determining an intersection region over which the regions overlap one another. The mobile locating system can search within the intersection region for the mobile device, as compared with other approaches that employ searching within the entirety of each geographical region covered by each of the BSs.

One or more of the embodiments can enhance mobile device locating relative to the time and processing required to perform mobile device locating based solely on relative timing between transmitting BSs over large geographic areas.

Figure 2:
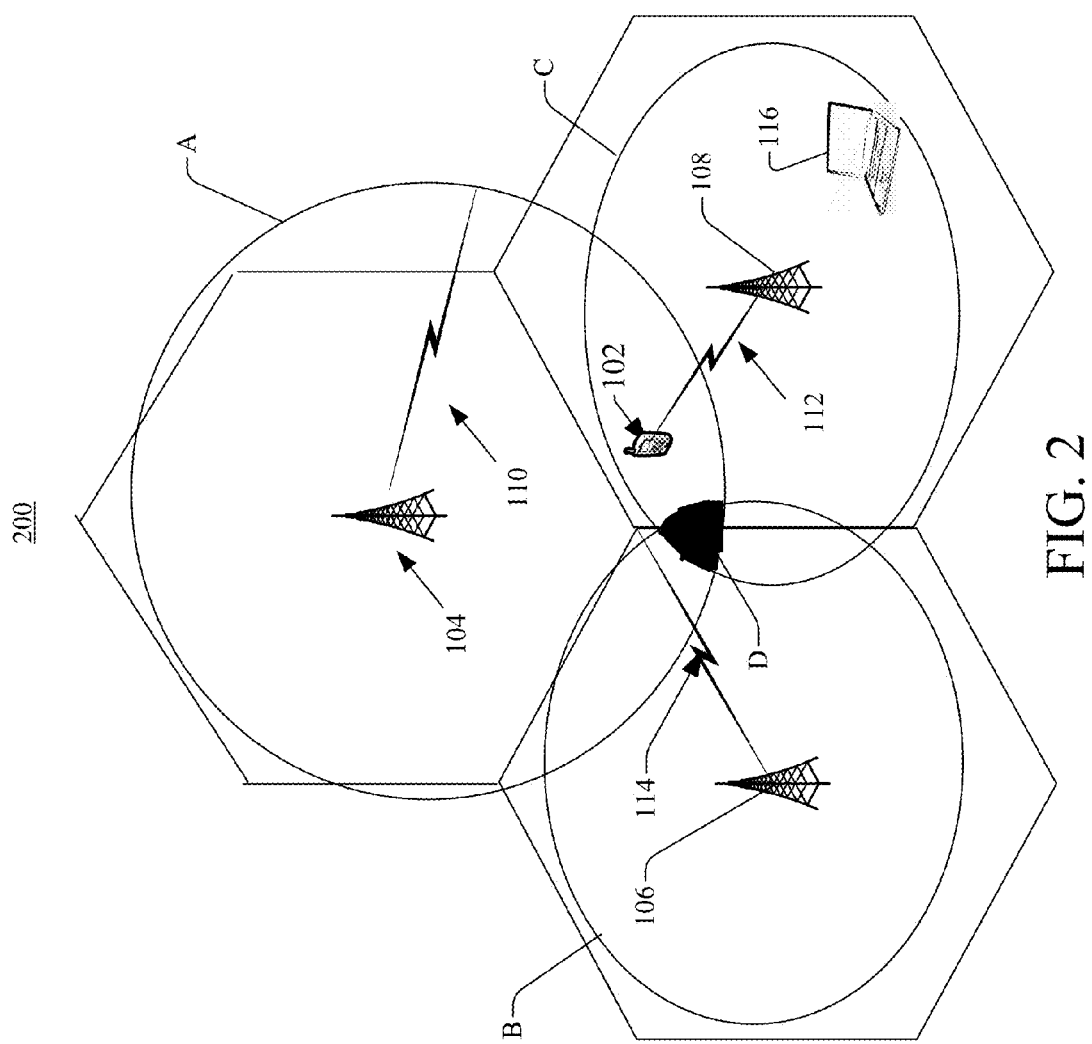
FIG. 2 illustrates an example diagram illustrating an intersection region employed by the system of FIG. 1 to facilitate processing for mobile device locating in accordance with embodiments described herein.

FIG. 1 illustrates an example system in which mobile device locating can be facilitated in accordance with embodiments described herein. FIG. 2 illustrates an example diagram illustrating an intersection region employed by the system of FIG. 1 to facilitate processing for mobile device locating in accordance with embodiments described herein.

Referring to FIG. 1, the system 100 can include a mobile device 102, BSs 104, 106, 108 configured to transmit signals 110, 112, 114 received by and measured at the mobile device 102, and a mobile device locating system 116. In some embodiments, the signals can be pilot signals including information such as transmission frame timing values, signal-to-noise ratio measurements and/or absolute signal strength measurements.

The BSs 104, 106, 108 cover geographical regions with the signals 110, 112, 114. For example, as shown in FIG. 2, BS 104 can cover the geographical region A, BS 106 can cover the geographical region B and BS 108 can cover the geographical region C. To perform mobile device locating and determine the location of the mobile device 102, the mobile device locating system 116 can perform a number of functions to limit the area over which the mobile device locating system 116 searches for the mobile device 102.

For example, in some embodiments, the mobile device locating system 116 can receive information indicative of the signal strengths of the signals 110, 112, 114 measured by the mobile device 102. The mobile device locating system 116 can determine an intersection region, such as shaded region D shown in FIG. 2, over which to search for the mobile device 102. In some embodiments, the mobile device locating system 116 can locate mobile device 102 via analysis of timing offsets observed and reported by the mobile device 102.

The structure and/or functionality of mobile device locating system 116 can be as described in further detail with reference to FIGS. 3-9 in various embodiments.

Figure 3:
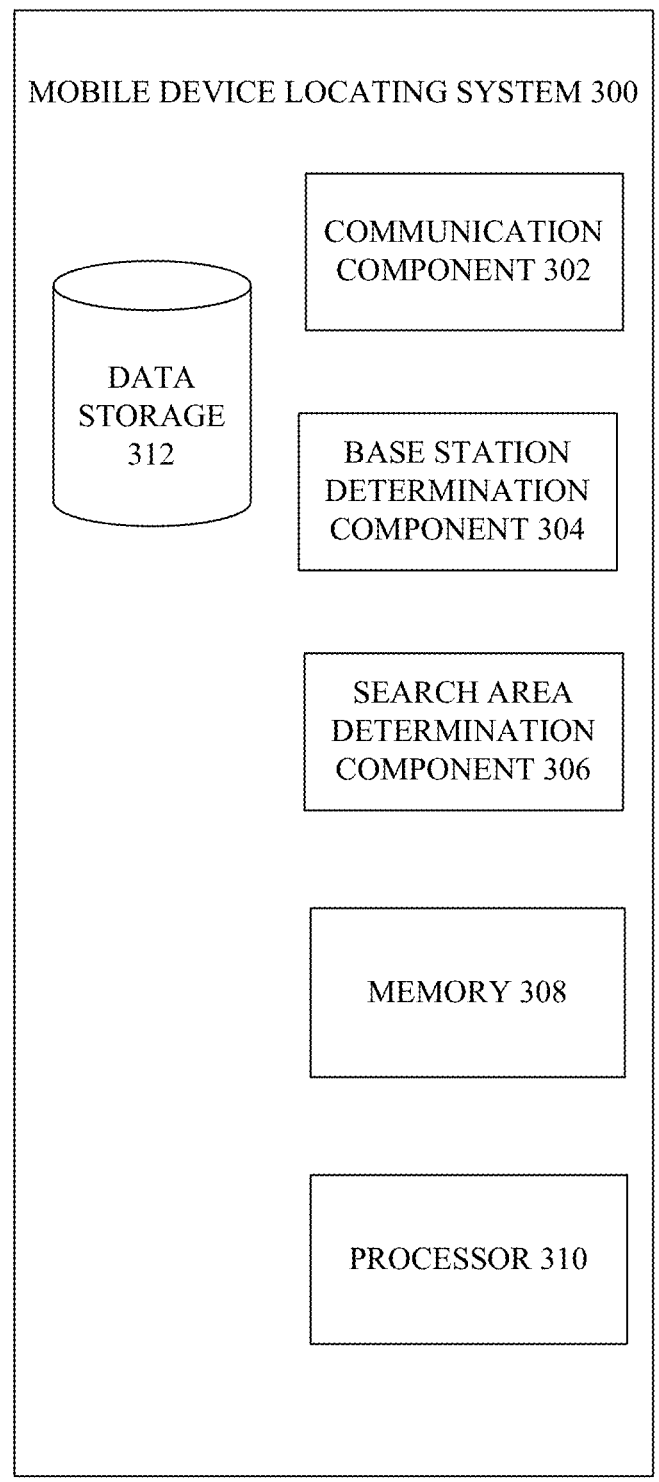
FIG. 3 illustrates an example mobile device locating system that facilitates processing for mobile device locating in accordance with embodiments described herein.
Figure 4:
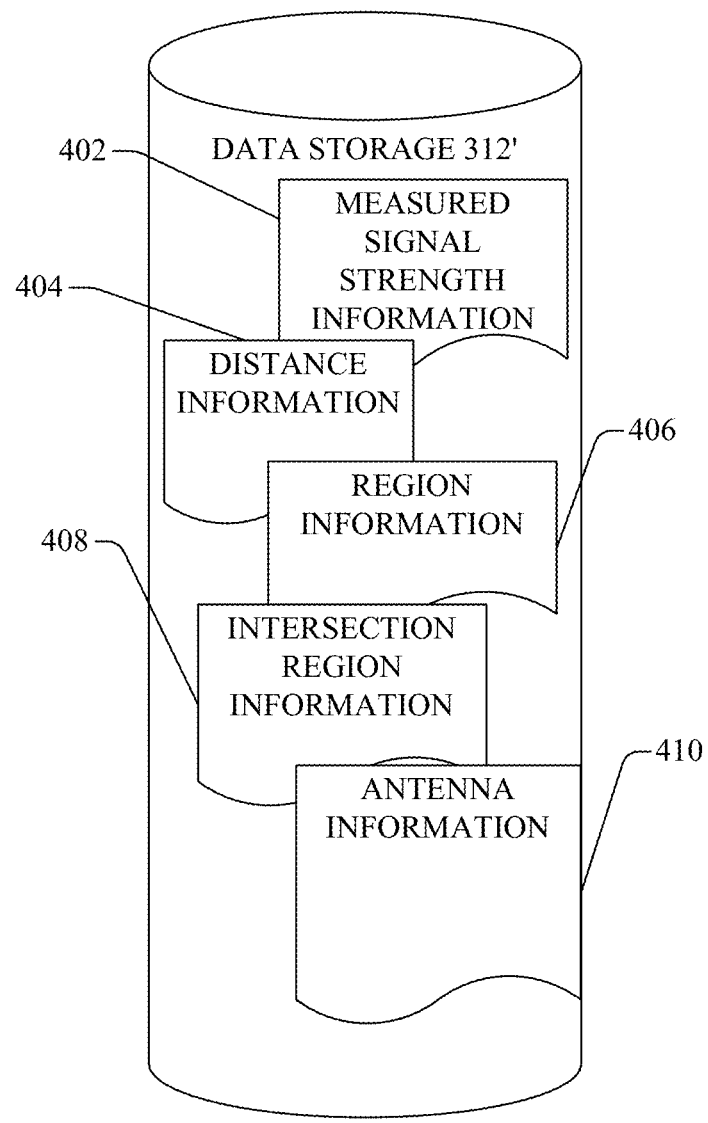
FIG. 4 illustrates an example data storage that facilitates processing for mobile device locating in accordance with embodiments described herein.

FIG. 3 illustrates an example mobile device locating system that facilitates mobile device locating in accordance with embodiments described herein. As shown in FIG. 3, mobile device locating system 300 can include a communication component 302, a BS determination component 304, a search area determination component 306, a memory 308, a processor 310 and/or data storage 312. In some embodiments, one or more of the communication component 302, BS determination component 304, search area determination component 306, memory 308, processor 310 and/or data storage 312 can be electrically and/or communicatively coupled to one another to perform one or more functions of the mobile device locating system 300.

The communication component 302 can transmit and/or receive information to and/or from one or more BSs and/or a mobile device. In some embodiments, the communication component 302 can receive signal strength information from a mobile device. The signal strength information can be information about the signal strength of a downlink pilot signal transmitted by a BS and received at the mobile device.

The BS determination component 304 can determine whether the signal strength information indicates that the mobile device is within a particular distance from the BS for which the mobile device reports the signal strength information. For example, in some embodiments, the signal measured for a particular BS by the mobile device can be greater than a predefined value, indicating that the mobile device is fairly close to the BS. In these embodiments, the BS determination component 304 can determine that the mobile device is within a particular distance to a single BS (e.g., within 1 kilometer from the BS). For example, in some embodiments, if the signal measured by the mobile device is particularly high (or greater than the predefined value), the BS determination component can assume that the mobile device is particularly close to the BS. The BS determination component 304 can identify the BS and, in some embodiments, the distance between the BS and the mobile device. In some embodiments, when the BS determination component 304 determines that the mobile device is within a particular distance to a single BS, the operations of the search area determination component 306 need not be performed.

The search area determination component 306 can define a region around each BS for which the mobile device reports the strength of a downlink pilot signal. The search area determination component 306 can then determine an intersection region over which the different regions for the different BS regions overlap. The search area determination component 306 can be described in greater detail with reference to FIG. 5.

The memory 308 can be a computer-readable storage medium storing computer-executable instructions and/or information for performing the functions described herein with reference to the mobile device locating system 300. Processor 310 can perform one or more of the functions described herein with reference to the mobile device locating system 300.

The data storage 312 can be configured to store information transmitted to, received by and/or processed by the mobile device locating system 300. For example, with reference to FIGS. 3 and 4, the data storage 312, 312' can store information identifying a BS that is particularly close to the mobile device, measured signal strength information 402, distance information 404, region information 406, intersection region information 408 and/or antenna information 410.

Figure 5:
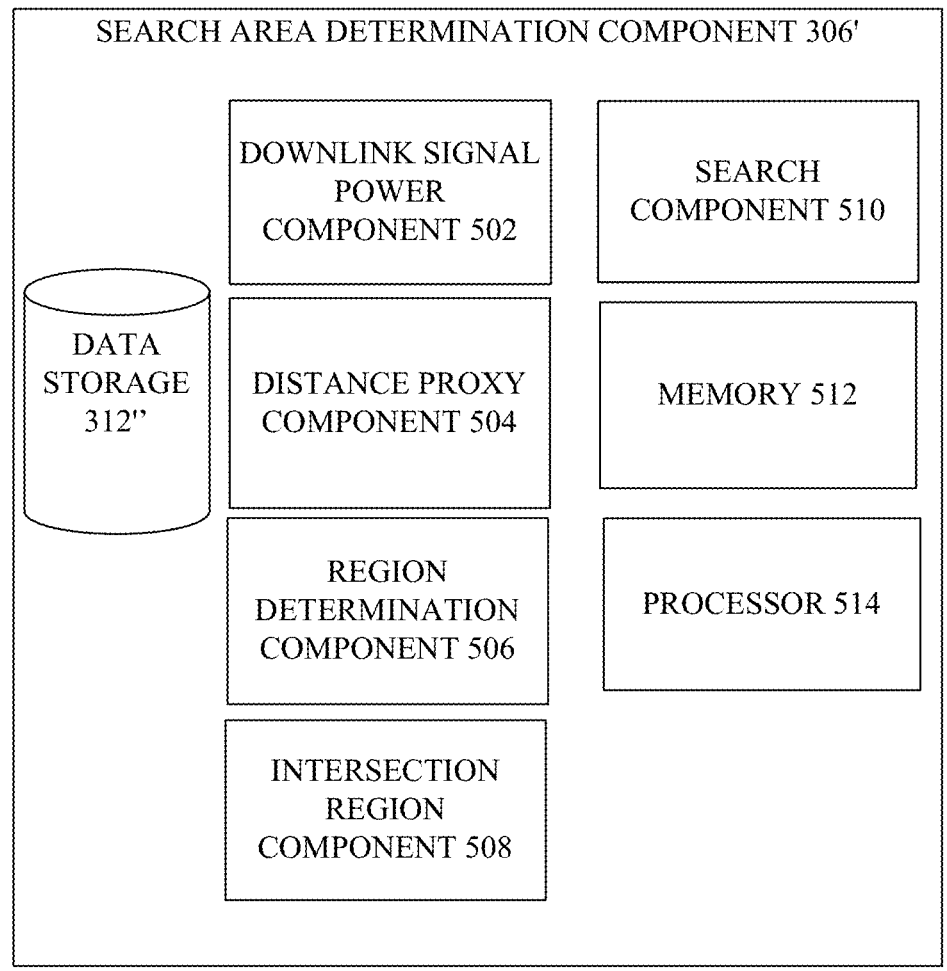
FIG. 5 illustrates an example search area determination component that facilitates processing for mobile device locating in accordance with embodiments described herein.

FIG. 5 illustrates an example search area determination component that facilitates mobile device locating in accordance with embodiments described herein. The search area determination component 306' can include the structure and/or functionality of the search area determination component 306 in some embodiments (and vice versa).

In some embodiments, the search area determination component 306 can include a downlink signal power component 502, distance proxy component 504, a region determination component 506, an intersection region component 508, a search component 510, a memory 512, a processor 514 and/or data storage 312". One or more of the downlink signal power component 502, distance proxy component 504, region determination component 506, intersection region component 508, search component 510, memory 512, processor 514 and/or data storage 312" can be electrically and/or communicatively coupled to one another to perform one or more functions of the search area determination component 306'.

The downlink signal power component 502 can determine expected downlink signal powers for the information received from the mobile device about the BS pilot signals. In some embodiments, the downlink signal power component 502 can employ a radio propagation model (e.g., Hata-Okumura radio propagation model) to make such determination. In particular, the downlink signal power component 502 can utilize the frequency of a channel over which the signal strength information is received by the mobile device, distances between the mobile device and the BSs, antenna heights of the BSs, antenna height of the mobile device and/or the morphology (e.g., urban, suburban, rural) of the terrain over which the signals are transmitted to determine expected powers for the BS signals.

Employing the radio propagation model, the downlink signal power component 502 can determine the BS signal path loss versus distance between the BS and the mobile device for each BS for which the mobile device reports measured signal strength information. The downlink signal power component 502 can utilize the BS signal path loss (along with the distance between the mobile device and BS) to determine expected downlink signal powers for the signal measured at the mobile device.

The distance proxy component 504 can determine the distance between the mobile device and a BS for which the mobile device reports the signal strength information. For example, the distance proxy component 504 can determine the distance between the mobile device and a BS by determining a maximum distance between the BSs and the mobile device based on the downlink signal strength for the BSs.

For example, in some embodiments, the distance proxy component 504 can determine the maximum distance between the mobile device and the BS by evaluating the reported measured signal strength at the mobile device and the expected signal power output from the downlink signal power component 502. The actual measured signal strength can be compared to the expected signal power to determine the actual distance between the mobile device and the BS.

In some embodiments, the signal strength measurement from the mobile device can be a proxy for distance from a base station if frequency and antenna heights are known.

The region determination component 506 can determine a region around each BS for which signal strength information is received from the mobile device. The region determination component 506 can determine the region by determining the location of the BS (which can be known in some embodiments) and determining the area covered by the pilot signal from the BS based on the strength of the pilot signal received and measured by the mobile device.

In some embodiments, the regions can be circular regions having the BS at the center of the circle and having a radius dictated by the signal strength reported by the mobile device. For example, the radius can be the maximum distance over which the mobile device can receive the signal from the BS, given the strength of the BS pilot signal.

In some embodiments, the regions determined around the BSs can have boundaries that overlap one another. Accordingly, the intersection region component 508 can determine an overlap area for the regions associated with the different BSs.

The intersection region can be polygonal and any number of different shapes, in various embodiments. In some embodiments, the intersection region can be an irregular polygonal region having a perimeter defined by the intersection of the regions. In some embodiments, the intersection region can be approximated as a rectangular region substantially covering the intersection region. In embodiments wherein the intersection region is approximated as a rectangular region, scanning the intersection region can be performed efficiently and with less computation than embodiments wherein scanning is performed for an irregular polygon.

The search component 510 can search the intersection region for the mobile device to perform mobile device locating. In some embodiments, the search component 510 can scan various regions within the intersection region. By way of example, but not limitation, the intersection region can be divided into a number of bins and the search component 510 can scan one or more of the bins to determine whether the mobile device is located in the bins.

As such, the search area determination component 306' can reduce an area over which searching is performed to locate the mobile device by determining and searching an intersection region (as compared to searching the entirety of each geographical region covered by each of the BSs for which the mobile device reports a pilot signal strength).

In some embodiments, reducing the search area can drastically reduce computation and conserve resource. For example, a mobile device can report signal strength information from a number of BSs within a 1-2 mile area and a number of BSs many miles away. Searching over a ten mile area, for example, may result in searching for the mobile device by scanning 25,000 100 m square bins for a best signal timing match. If the mobile device reports a high signal strength from one of the BSs, the high signal strength can result in searching a maximum distance of 500 m from the BS for which the high signal strength is reported. As such, scanning can be performed in a much smaller area (e.g., an area including only 100 100 meter square bins). Accordingly, the computational effort to perform the scanning is reduced by 100/25,000 of the original effort (i.e., 99.6% reduction in computation).

In some embodiments, computational effort can be reduced by at least 75% in all morphologies (e.g., urban, suburban and rural morphologies). Conversely for a given set of computational system resources, the system can locate at least four times as many mobile devices as compared to systems that search the entirety of the geographical regions covered by each of the BSs reported by the mobile device.

In addition, location determinations based solely on timing information from the mobile device can have the potential to have occasional large locating errors if the BS to BS relative timing calibration is offset and undetected. However, by bounding the search areas initially based on signal strength (as described with reference to the distance proxy component 504), the error introduced can be partially mitigated.

Further, while the Hata-Okumura radio propagation model was noted above, and assumes path loss associated with urban, suburban or rural morphologies, in some embodiments, atypically low path loss parameters (e.g., parameters that occur across lakes or in conditions called atmospheric super-refraction and atmospheric refractive ducting) can be assumed. These conditions cause high temperature gradients. For example, line of sight path loss can be assumed to a distance between 500 meters and 1000 meters and then the model can migrate gradually to the Hata-Okumura radio propagation model assumptions with increasing distance between the BS and the mobile device. At approximately 15 kilometers from the BS, the model can assume 15% line of sight path loss and 85% Hata-Okumura assumptions. This embodiment still gives a presumptive edge to increasing the bounding search to something perhaps 20% larger in area than would otherwise be implied by Hata-Okumura assumptions exclusively.

Figure 6:
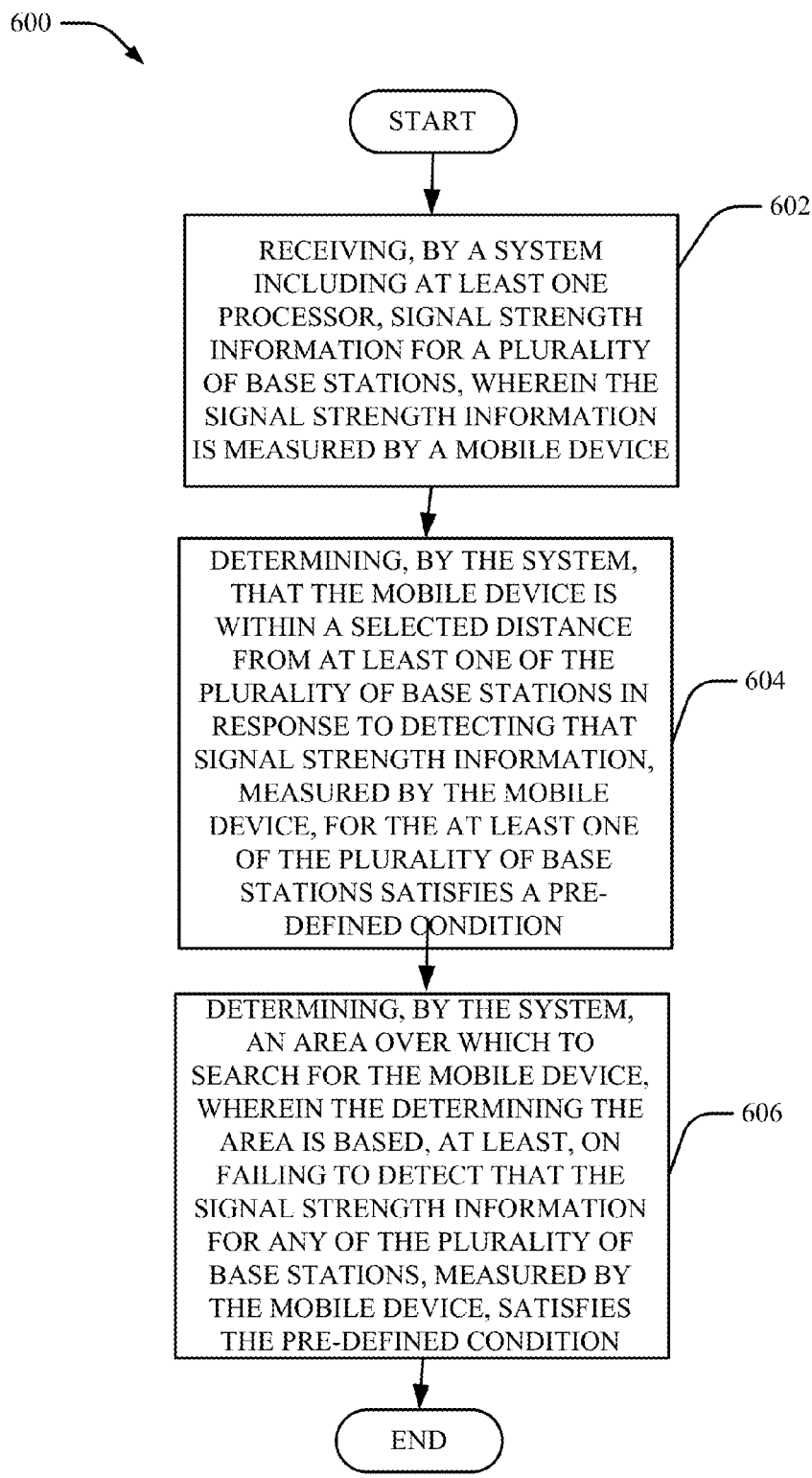
FIGS. 6-9 illustrate example flowcharts of methods that facilitate processing for mobile device locating in accordance with embodiments described herein.

FIGS. 6-9 illustrate example flowcharts of methods that facilitate mobile device locating in accordance with embodiments described herein. Turning first to FIG. 6, at 602, method 600 can include receiving signal strength information for the BSs. The signal strength information can be measured by a mobile device. In various embodiments, the signal strength information can include or be BS downlink signal strengths as measured at the mobile device.

At 604, method 600 can include determining, by the system, that the mobile device is within a selected distance from at least one of the BSs in response to detecting that signal strength information, measured by the mobile device, for the BS satisfies a pre-defined condition. For example, a maximum distance can be determined between the BS and the mobile device based on the downlink signal strength for the BS, as measured by the mobile device.

The maximum distance can be the distance over which the mobile device can receive the signal from the BS, given the strength of the BS signal. As such, a weaker signal measured at the mobile device can imply a longer distance between the mobile device while a stronger signal measured at the mobile device can imply a shorter distance between the mobile device and a BS.

In some embodiments, the signal measured for a particular BS by the mobile device can be greater than a predefined value, indicating that the mobile device is fairly close to the BS. In these embodiments, the mobile device can be determined to be within a particular distance to the BS (e.g., within 1 kilometer from the BS) and step 606 need not be performed.

At 606, method 600 can include determining, by the system, an area over which to search for the mobile device. Determining the area can be based on detecting that signal strength information for each of the BSs is not greater than the predefined value. Accordingly, in embodiments wherein none of the measured signals from the BSs have strength greater than a predefined value, an area can be determined for searching for the location of the mobile device.

A method for determining the area over which to search can be performed, in some embodiments, as described with reference to FIG. 7.

Figure 7:
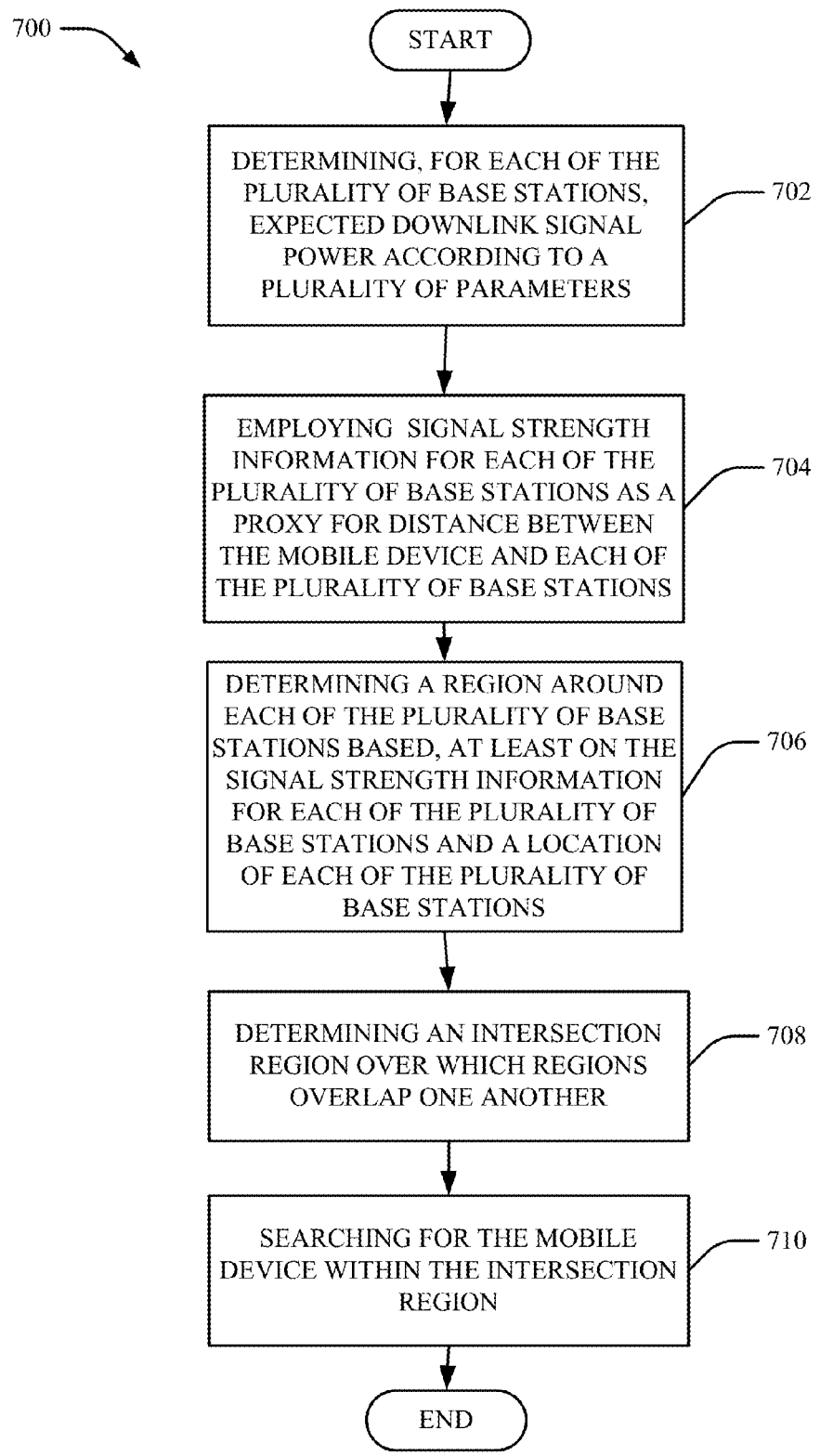

Turning now to FIG. 7, at 702, method 700 can include determining, for the plurality of base stations, respective expected downlink signal powers according to a plurality of parameters. In some embodiments, the respective expected downlink signal powers can be determined according to a frequency of a channel over which the signal strength information is received by the mobile device, respective distances between the mobile device and the BSs, respective antenna heights of the BSs, antenna height of the mobile device and/or the general morphology of urban, suburban, rural areas over which the BS signals are transmitted.

In some embodiments, to determine the expected downlink signal powers, a radio propagation model (e.g., Hata-Okumura radio propagation model) can be employed utilizing the frequency of a channel over which the signal strength information is received by the mobile device, distances between the mobile device and the plurality of base stations, antenna heights of the BSs and/or an antenna height of the mobile device. Employing the radio propagation model, BS signal path loss versus distance between the BS and the mobile device can be determined. The BS signal path loss can be employed (along with the distance between the mobile device and BS) to determine expected downlink signal powers for the signal measured at the mobile device.

At 704, method 700 can include employing respective signal strength information for the BSs as respective proxies for distance between the mobile device and the BSs. In some embodiments, the signal strength information can be a proxy for determining distance by determining a maximum distance between the BSs and the mobile device based on the downlink signal strength for the BSs, as described with reference to 602. In particular, method 800 includes one such method of employing the signal strength information as a proxy for distance.

Figure 8:
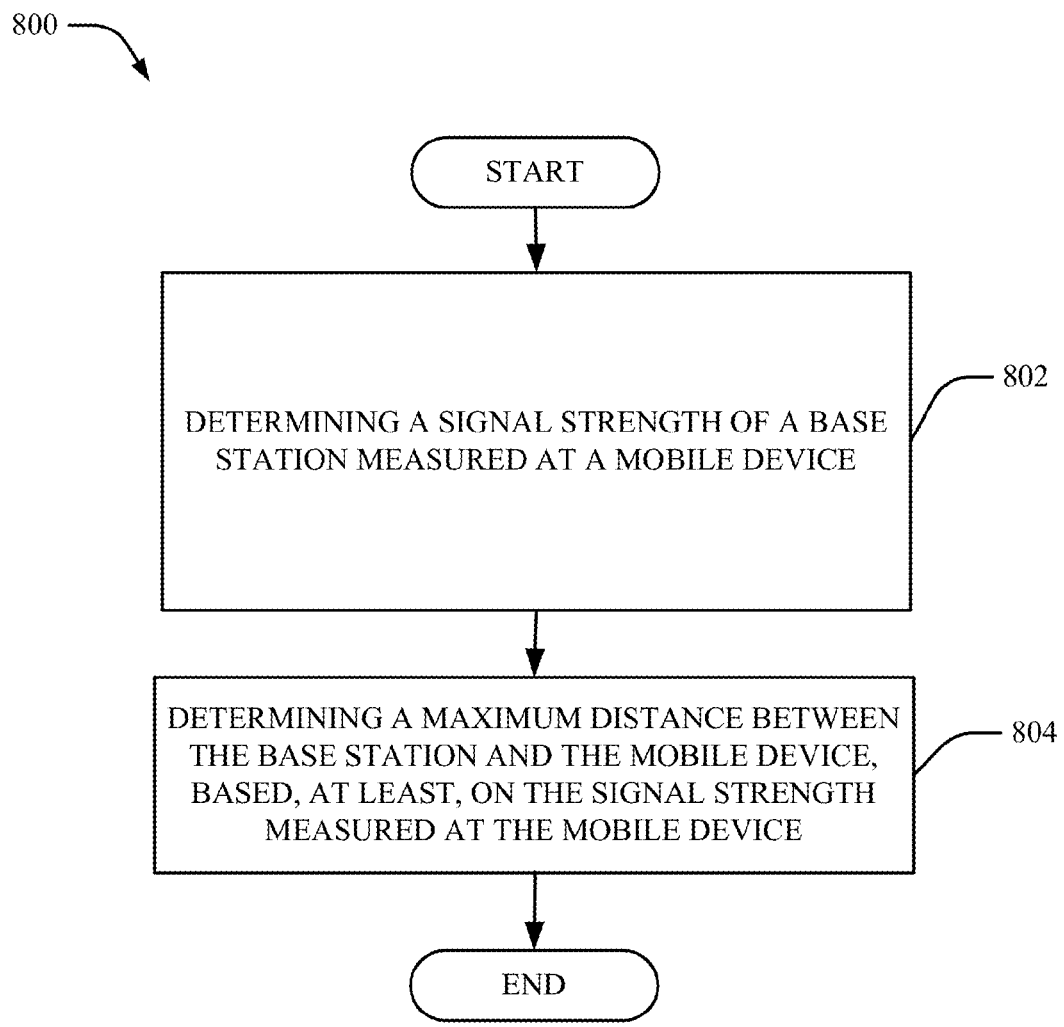

Turning now to FIG. 8, at 802, method 800 can include determining signal strength of a BS measured at a mobile device. At 804, method 800 can include determining a maximum distance between the BS and the mobile device based, at least, on the signal strength measured at the mobile device.

Turning back to FIG. 7, at 706, method 700 can include determining respective regions around the BSs based, at least on the signal strength information for the BSs and respective locations of the BSs. In some embodiments, the regions can be circular regions.

The locations of the BSs can be known in some embodiments. Each region can include the BS at an approximate center of the region, in some embodiments. For example, the regions can be circular regions having the BS at the center of the circle and having a radius dictated by the signal strength measured by the mobile device. For example, the radius can be the maximum distance between the BS and the mobile device as described with reference to 704.

At 708, method 700 can include determining an intersection region over which the regions overlap one another. In some embodiments, the regions determined around the BSs can have boundaries that overlap one another. As such, the intersection region can be the intersection, or area, over which each of the regions overlap.

At 710, method 700 can include searching for the mobile device within the intersection region. In various embodiments, scanning techniques can be employed to scan the intersection region. In some embodiments, the scanning for the mobile device can be performed using timing measurements provided by the mobile device.

Accordingly, the region over which the scanning is performed is reduced relative to approaches that scan the entirety of each region covered by the BSs (as opposed to merely scanning the intersection region).

The intersection region can be an irregular polygonal region having a perimeter defined by the intersection of the regions. In some embodiments, the intersection region can be approximated as a rectangular region substantially covering the intersection region. Accordingly, in embodiments wherein the intersection region is approximated as a rectangular region, scanning the intersection region can be performed efficiently and with less computation.

Figure 9:
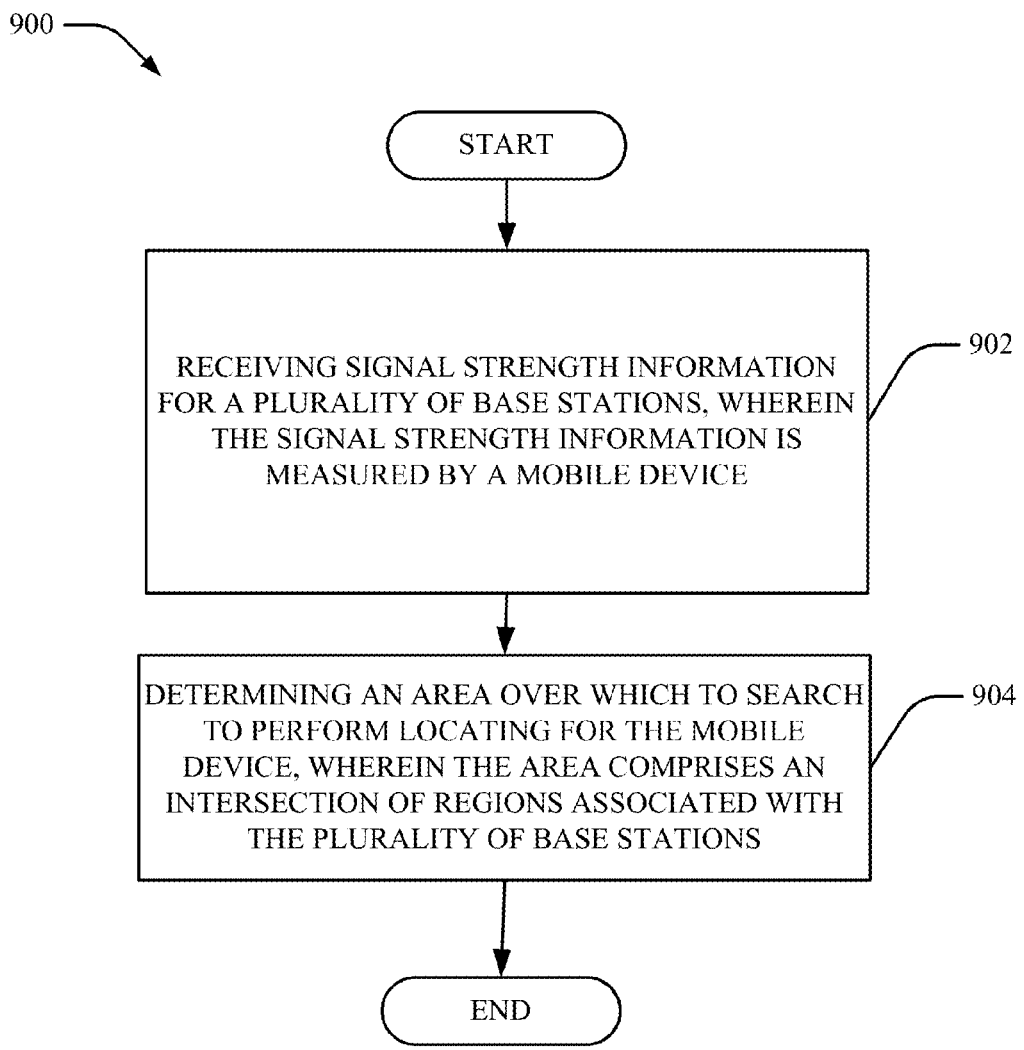

Turning now to FIG. 9, at 902, method 900 can include receiving signal strength information for the BSs, wherein the signal strength information is measured by a mobile device.

At 904, method 900 can include determining an area over which to search for the mobile device, wherein the area comprises an intersection of regions associated with the BSs. Accordingly, in some embodiments, as described with reference to FIG. 6, a determination can be made as to whether a mobile device is within a particular distance to a selected BS and, if so, an intersection region need not be scanned. In some embodiments, however, the intersection region is formed and scanned without resort to a determination as to whether the mobile device is within a particular distance to a selected BS.

Figure 10:
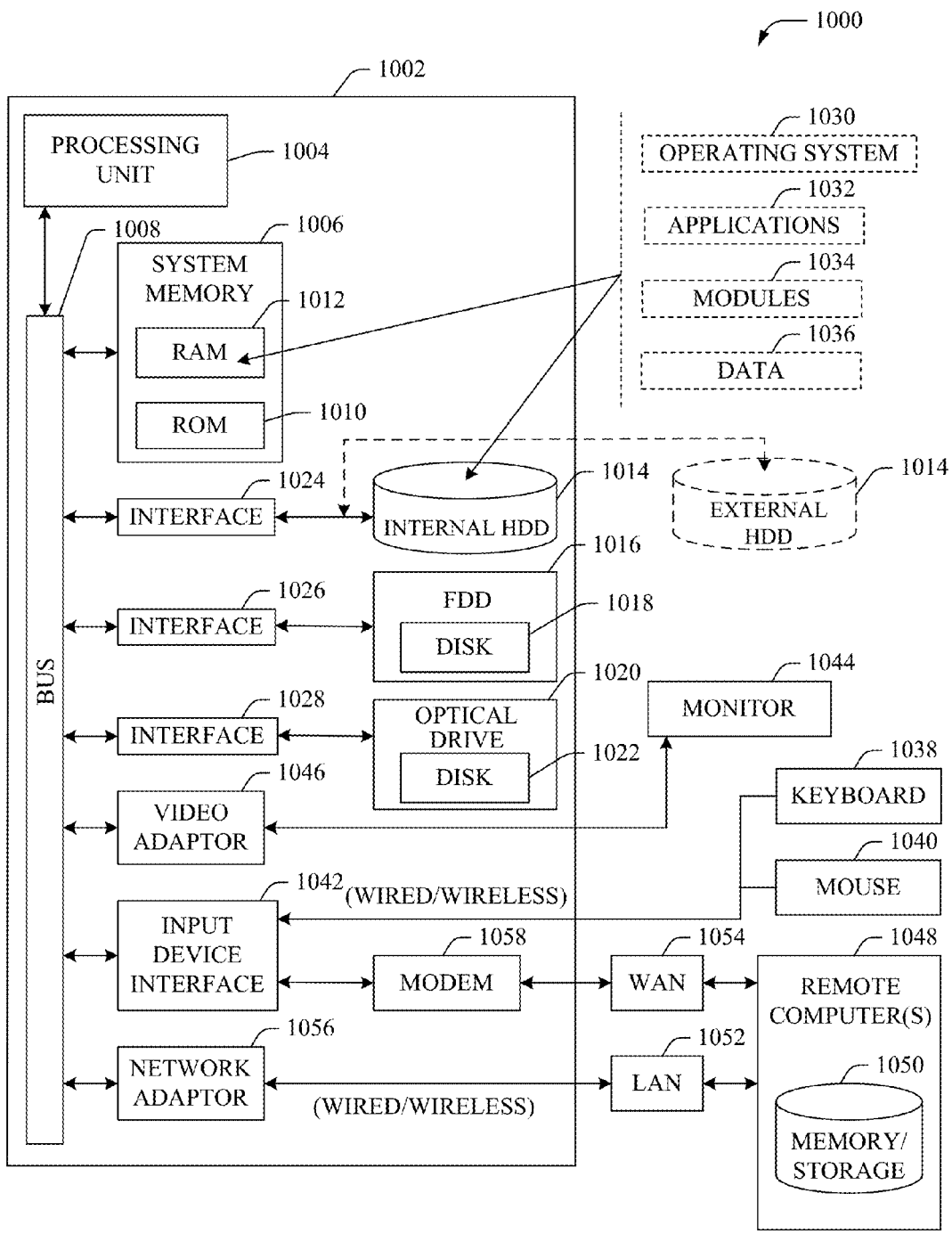
FIG. 10 illustrates a block diagram of a computer operable to facilitate processing for mobile device locating.

Referring now to FIG. 10, there is illustrated a block diagram of a computer operable to facilitate antenna location determination. For example, in some embodiments, the computer can be or be included within the mobile device locating system 116, 300.

In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable storage medium, comprising executable instructions that, when executed by a processor, facilitate performance of operations, comprising:
determining respective signal strength information for base station devices, wherein the respective signal strength information is measured by a mobile device;
based on the mobile device measuring signal strength information for a base station device of the base station devices and determining the signal strength information for the base station device satisfies a defined condition, wherein the defined condition comprises the signal strength information for the base station device being determined to be greater than a defined threshold:
decreasing an initial search area associated with a set of the base station devices to a search area associated with the base station device having the signal strength information that satisfies the defined condition;
determining a defined distance from an approximate location of the base station device comprising the signal strength information that satisfies the defined condition, wherein an amount of the defined distance is based on another amount of the signal strength information for the base station device; and
scanning bin regions representing the search area, wherein the search area is a polygonal region.

2. The non-transitory machine-readable storage medium of claim 1, wherein the operations further comprise:
determining respective regions around the base station devices based at least on the respective signal strength information for the base station devices and respective locations of the base station devices.

3. The non-transitory machine-readable storage medium of claim 2, wherein the operations further comprise:
determining an intersection of the respective regions around the base station devices.

4. The non-transitory machine-readable storage medium of claim 1, wherein the polygonal region is an irregular polygonal region.

5. A system, comprising:
a processor; and
a memory that stores executable instructions that, when executed by the processor, facilitate performance of operations, comprising:
receiving respective signal strength information for base station devices, wherein the respective signal strength information is measured by a mobile device; and
based on the mobile device measuring signal strength information for a base station device of the base station devices and determining the signal strength information for the base station device satisfies a defined condition, wherein the defined condition comprises the signal strength information for the base station device being determined to be greater than a defined threshold:
reducing an initial search area associated with a set of the base station devices to a search area associated with the base station device having the signal strength information that satisfies the defined condition;
determining a defined distance from an approximate location of the base station device comprising the signal strength information that satisfies the defined condition, wherein an amount of the defined distance is based on another amount of the signal strength information for the base station device; and
scanning bin regions representing the search area, wherein the search area is an irregular polygonal region.

6. The system of claim 5, wherein the receiving the signal strength information comprises receiving downlink signal strengths measured at the mobile device.

7. The system of claim 5, wherein the operations further comprise searching the area for the mobile device, the searching comprising:
performing a first determination, for the base station devices, of respective expected downlink signal powers according to parameters;
utilizing the respective signal strength information for the base station devices, measured by the mobile device, as a proxy for respective distances between the mobile device and the base station devices;
performing a second determination of respective regions associated with the base station devices based at least on the respective signal strength information for the base station devices and respective locations of the base station devices; and
performing a third determination of an intersection of the respective regions.

8. The system of claim 7, wherein the performing the first determination of the respective expected downlink signal powers is made with respect to respective antenna heights of the base station devices and an antenna height of the mobile device.

9. The system of claim 7, wherein the performing the third determination of the intersection of the respective regions comprises generating an approximation of a rectangular region at least substantially covering the intersection of the regions.

10. The system of claim 7, wherein the performing the third determination of the intersection of the respective regions comprises generating a definition of an irregular polygonal region having a perimeter defined by the intersection of the regions.

11. The system of claim 7, wherein the performing the first determination of the respective expected downlink signal powers is made with respect to a morphology of a terrain over which downlink signals are transmitted.

12. The system of claim 7, wherein the performing the first determination of the respective expected downlink signal powers is made with respect to a frequency of a channel over which the respective signal strength information is received by the mobile device.

13. A method, comprising:
receiving, by a device comprising a processor, respective signal strength information for base station devices, wherein the respective signal strength information is measured by a mobile device; and
based on the mobile device measuring signal strength information for a base station device of the base station devices and determining the signal strength information for the base station device satisfies a defined condition, wherein the defined condition comprises the signal strength information for the base station device being determined to be greater than a defined threshold:
reducing, by the device, an initial search area associated with a set of the base station devices to a search area associated with the base station device having the signal strength information that satisfies the defined condition;
determining, by the device, a defined distance from an approximate location of the base station device comprising the signal strength information that satisfies the defined condition, wherein an amount of the defined distance is based on another amount of the signal strength information for the base station device; and
scanning, by the device, bin regions representing the search area, wherein the search area is a polygonal region.

14. The method of claim 13, further comprising:
determining, by the system, an intersection region over which the respective regions around the base station devices overlap one another.

15. The method of claim 14, further comprising searching, by the system, for the mobile device within the intersection region.

16. The method of claim 14, further comprising determining, by the system, the respective expected downlink signal power information according to respective parameters.

17. The method of claim 16, wherein the determining the respective expected downlink signal power information according to respective parameters comprises determining the respective expected downlink signal power information according to a frequency of a channel over which respective signal strength information for the base station devices is received by the mobile device.

18. The method of claim 14, wherein the intersection region comprises approximating a rectangular region substantially covering the intersection region.

19. The method of claim 14, wherein the determining the intersection region comprises determining an irregular polygonal region.

20. The method of claim 19, wherein the irregular polygonal region comprises a perimeter defined by an intersection of the respective regions.

* * * * *